W. C. STEVENS.
METHOD OF MAKING STRAIGHT SIDE TIRES.
APPLICATION FILED JULY 31, 1913.
1,101,103.
Patented June 23, 1914.
3 SHEETS—SHEET 1.
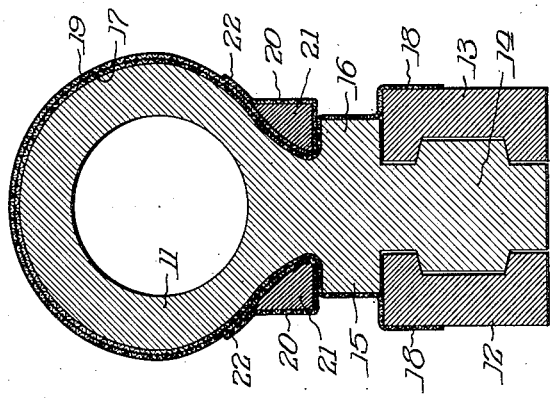
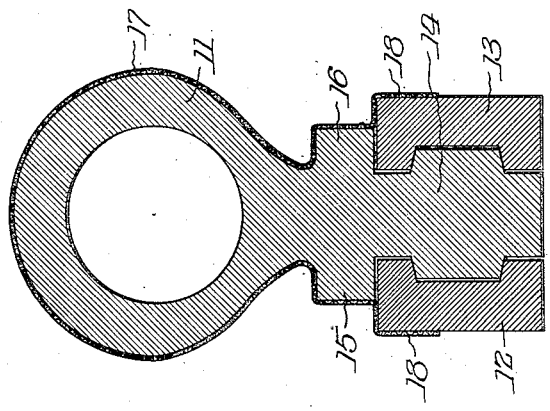

W. C. STEVENS.
METHOD OF MAKING STRAIGHT SIDE TIRES.
APPLICATION FILED JULY 31, 1913.
1,101,103.
Patented June 23, 1914.
3 SHEETS—SHEET 2.
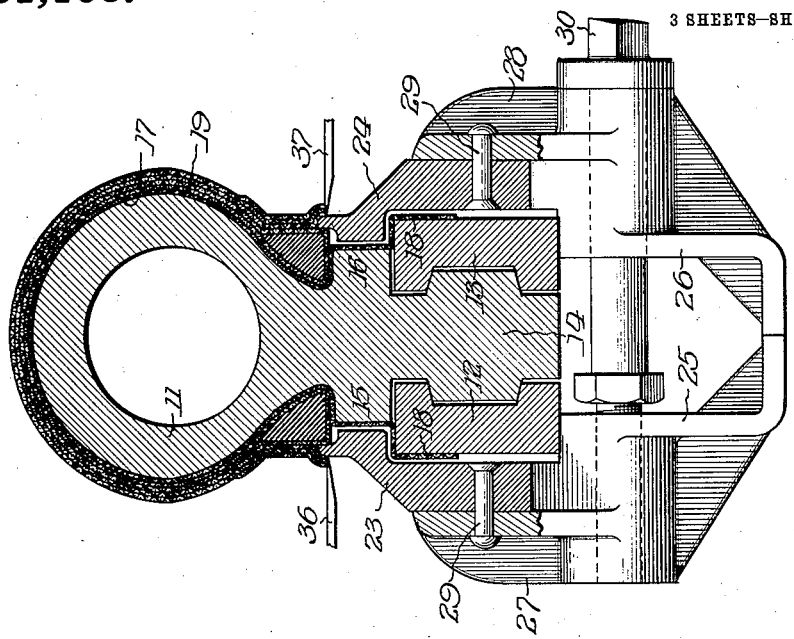
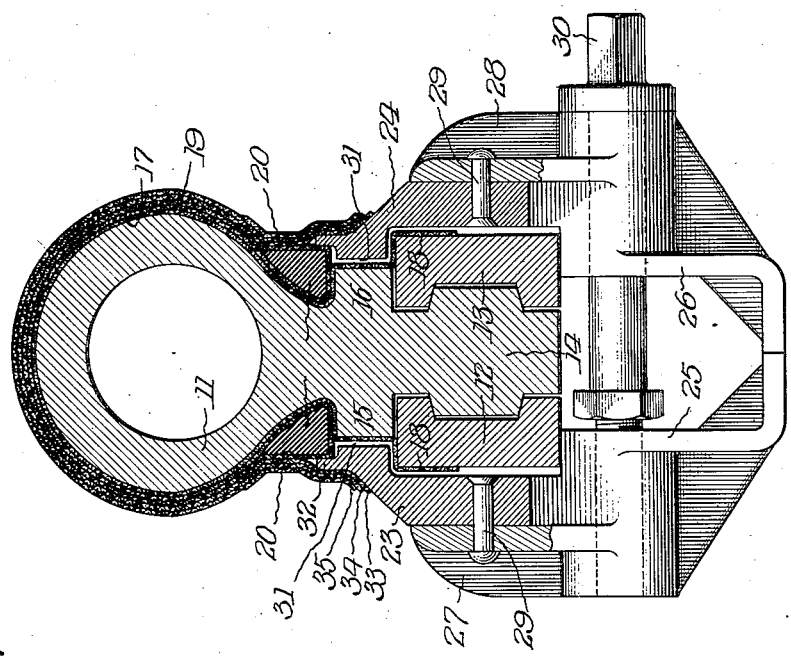
Witnesses:
Inventor:
William C. Stevens
By Linthicum, Beer & Fuller
Attys

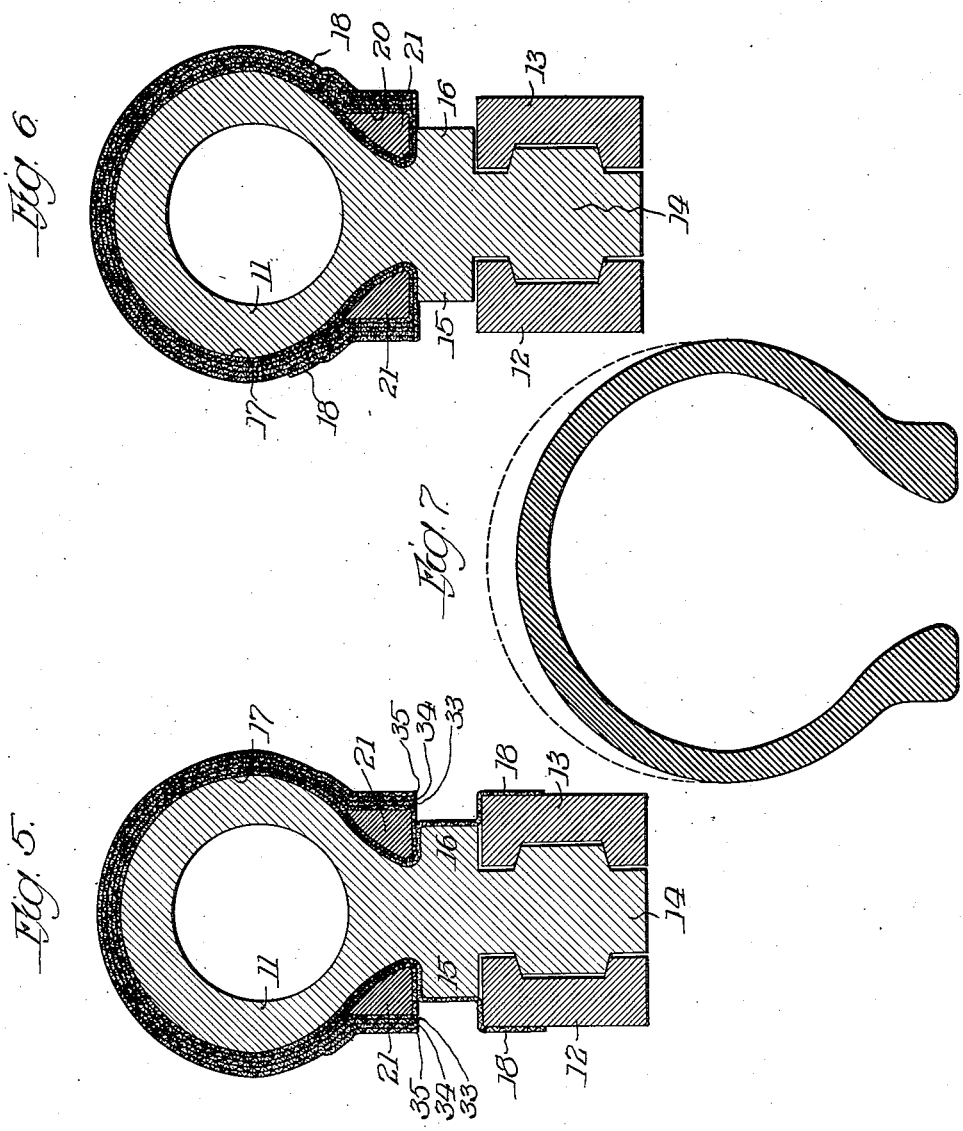

UNITED STATES PATENT OFFICE.

WILLIAM C. STEVENS, OF AKRON, OHIO, ASSIGNOR TO THE FIRESTONE TIRE & RUBBER COMPANY, OF AKRON, OHIO, A CORPORATION OF OHIO.

METHOD OF MAKING STRAIGHT-SIDE TIRES.

1,101,103.  Specification of Letters Patent.  Patented June 23, 1914.

Application filed July 31, 1913. Serial No. 782,176.

*To all whom it may concern:*

Be it known that I, WILLIAM C. STEVENS, a citizen of the United States, residing at Akron, in the county of Summit and State of Ohio, have invented certain new and useful Improvements in Methods of Making Straight-Side Tires, of which the following is a specification.

In the manufacture of pneumatic tires the same are ordinarily built up of successive layers of rubber impregnated fabric the marginal bead of fibrous and rubber composition being interposed between certain of the layers and the edges of the interlying layers being then folded upon themselves and the bead to inclose the latter.

The object of this invention is an improved method and apparatus used in connection therewith for building up the layers of straight side tires with the beads incorporated therein, whereby to secure greater efficiency coupled with economy in manufacture.

In the accompanying drawings and in the description based thereon are set forth the improved method and one form of apparatus for carrying out the same. As, however, the invention is capable of modification as to minor features without departing from the essence of the same it is to be understood that the description and drawings are to be taken in an illustrative rather than in an unnecessarily limiting sense.

In the drawings Figures 1 to 6 inclusive are cross sectional views illustrating different steps in the manufacture of a tire, and the apparatus used in connection with successive steps; and Fig. 7 is a cross sectional view of the tire at the conclusion of that stage of manufacture to which the present invention relates.

In the manufacture of the tire an annular form 11 is employed which is supported between facing rings 12, 13, these rings engaging upon opposite sides of the inner fin 14 and beneath the shoulders 15 and 16, the upper faces of which shoulders serve to receive the beads at the proper time. Upon the form is placed a layer of rubber impregnated fabric 17 which is caused to follow the contour of the form its edges depending along the outer side faces of the shoulders 15 and 16 and also alongside the outer faces of the rings 12 and 13 as indicated at 18, 18 in Fig. 1. Exterior to the layer 17 is placed another layer 19 (Fig. 2) of substantially the same width as the layer 17. The edges 20, 20 of the layer 19, however, are not secured to the depending edges of the layer 19 alongside the shoulders of the form and the facing rings but are allowed to hang freely. Annular beads 21, 21 are then positioned upon each side of the form above the shoulders 15, 16 and upon the layer 19 and after the positioning of the beads the depending edges 20 of the layer 19 are folded around the bead and upwardly into engagement with the layer 19 above the bead at 22, 22, all as shown in Fig. 2. The beads 21 being now secured in their permanent position by the edges 20 of the fabric layer 19 the trimming rings or plates 23, 24 are arranged in flanking relation to the facing rings 12 and 13 being held in position with reference to the same and to the form by means of clamps 25, 26 to the jaws 27, 28 of which they are secured by means of bolts or rivets 29, 29, each pair of clamps being adjustably secured in position by means of a bolt 30.

The construction of the clamps and trimming plates is such that an interspace 31 is provided between the edges 18 of the fabric 17 and the inner face of the trimming rings so that the former is protected from injury and from adhering to the side trimming rings. The trimming rings have outer marginal flanges 32 which flank the lower edges of the beads all of which is clearly shown in Fig. 3. The trimming rings having been mounted in the position shown and described outer layers of fabric 33, 34 and 35 are successively applied to the inner layers 17 and 19, the layer edges of these outer layers overlapping the upturned edges 22 of the layer 19 and depending alongside the outer face of the beads in contact with the upturned portion 20 of the layer 19 as shown. Cutting blades 36 and 37 are then applied in pressure contact with the outer face of the depending portions of the layers 33, 34 and 35 as indicated in Fig. 4 which blades acting upon these layers of fabric with the trimming plates 23 and 24 as a backing trim the depending edges of the outer layers along a line substantially flush with the lower faces of the beads. Thereupon the trimming plates are removed and the tire is left with its several layers in the condition shown in Fig. 5. The depending edges 18 of the innermost layer 17 are then folded outwardly back over the outer layers and the inclosed bead, as shown in Fig. 6. This completes that stage of the manufacture of the tire to which the present invention relates and leaves a tire of substantially the cross sectional shape shown in Fig. 7 ready for curing and for the application of the tread indicated in dotted lines.

In the several views illustrating the successive steps of manufacture the thickness of the several fabric layers is exaggerated and the overlapping portions indicated by roughness of outline, which, as will be readily understood, are not found in practice, the lines of overlap not being distinguishable, the planes of the different layers merging one into another with a result more correctly represented in Fig. 7.

I claim:

1. The method of making pneumatic tires, which consists in applying to a form inner layers of fabric certain of which layers have depending edges, positioning the beads upon the fabric, applying outer layers of fabric with their edges alongside the outer side of the bead and depending below the latter, trimming the depending edges of the outer layers substantially flush with the lower face of the bead while shielding the inner layers, and folding the depending edges of the inner layer back over the beads and the outer layers, substantially as described.

2. The method of making pneumatic tires, which consists in applying to a form inner layers of fabric of which the innermost layer has depending edges, positioning the beads upon the fabric, folding certain of the layers back over the bead into contact with the sides of the exterior layer, applying outer layers of fabric with their edges alongside of and depending below the bead, supporting the inner faces of the depending edges of the outer layers, applying cutting pressure to the outer faces of the said layers to trim the edges of the same substantially flush with the lower face of the bead, and folding the depending edges of the innermost layer back over the bead and the outer layers, substantially as described.

3. The method of making pneumatic tires, which consists in applying to a form two inner layers of fabric of which the innermost layer has depending edges, positioning the beads upon the fabric, folding the outer one of the two layers back over the bead into contact with its own outer face, applying outer layers of fabric with their lower portion alongside of and with their edges depending below the bead, supporting the inner faces of the depending edges of the outer layers, applying cutting pressure to the outer face of said layers to trim the edges of the same substantially flush with the lower faces of the beads, and folding the depending edges of the innermost layer back over the bead and the outer layers, substantially as described.

In testimony whereof I have hereunto signed my name in the presence of two witnesses.

WILLIAM C. STEVENS.

Witnesses:
S. G. CARKHUFF,
T. L. RODGERS.